Figure 1:
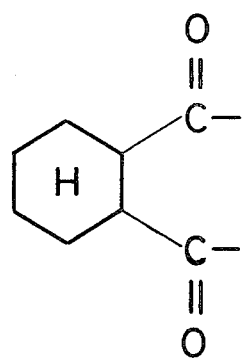
Figure 2:
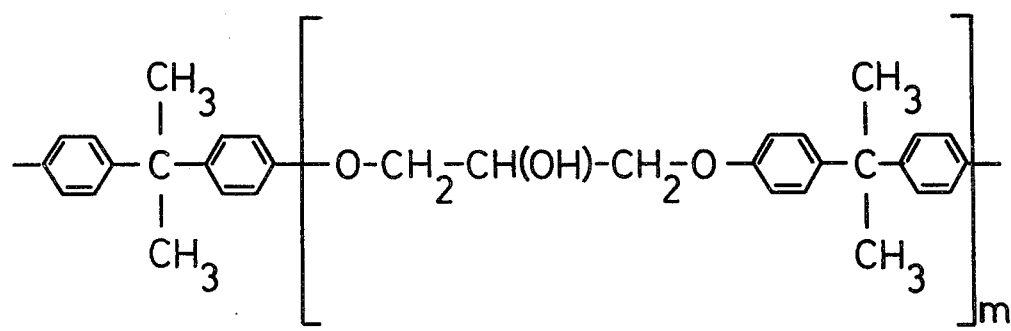
Figure 3:
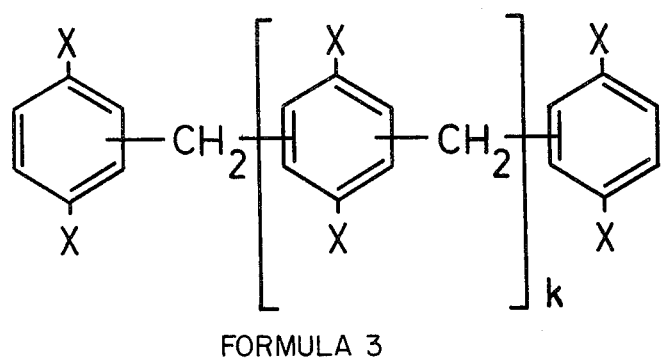
Figure 4:
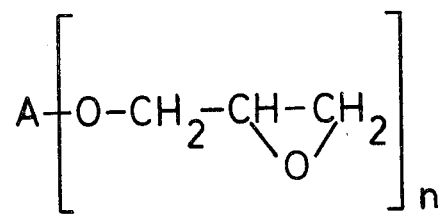
Figure 5:
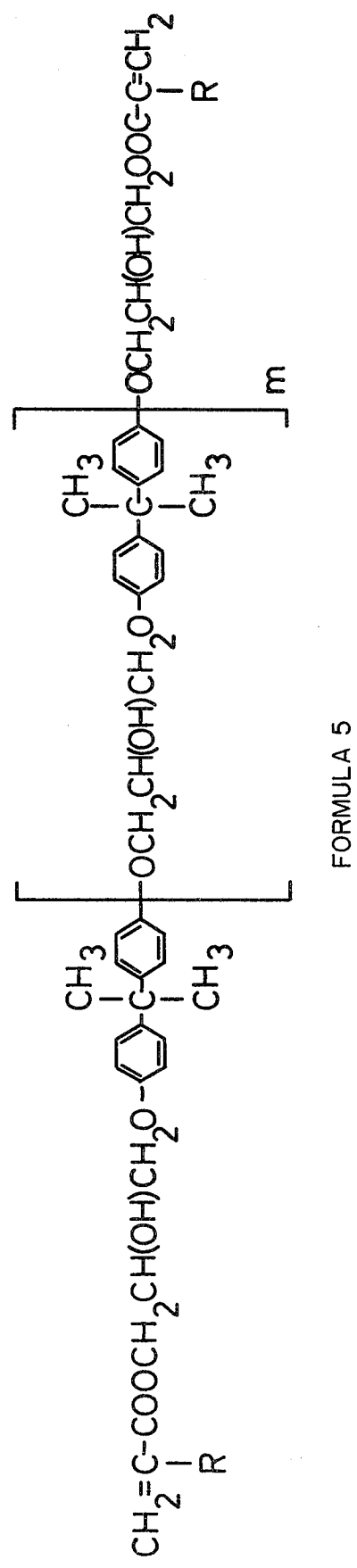

United States Patent [19]

Penczek et al.

[11] 4,424,299
[45] Jan. 3, 1984

[54] PROCESS FOR MANUFACTURING OF UNSATURATED POLYESTER RESINS WITH REDUCED VOLITILIZATION OF MONOMER

[75] Inventors: Piotr A. Penczek; Zofia Klosowska-Wolkowicz; Ewa J. Kicko-Walczak, all of Warsaw; Andrzej Kopec, Wolomin, all of Poland

[73] Assignee: Instytut Chemii Przemyslowej, Warsaw, Poland

[21] Appl. No.: 480,378

[22] Filed: Apr. 5, 1983

Related U.S. Application Data

[63] Continuation of Ser. No. 155,010, May 30, 1980, abandoned.

[30] Foreign Application Priority Data

Jun. 1, 1979 [PL] Poland ................................. 216027
Feb. 11, 1980 [PL] Poland ................................. 221931

[51] Int. Cl.$^3$ ..................... C08G 63/76; C08L 63/10; C08L 67/06
[52] U.S. Cl. ..................................... 525/31; 525/480; 525/530; 528/112
[58] Field of Search .......................................... 525/31

[56] References Cited

U.S. PATENT DOCUMENTS 3,621,093 11/1971 Svoboda et al. ........................ 525/31
4,293,659 10/1981 Svoboda ................................. 525/31
4,336,344 6/1982 Craigie .................................... 525/31

FOREIGN PATENT DOCUMENTS 2554930 6/1977 Fed. Rep. of Germany .

Primary Examiner—J. Ziegler

[57] ABSTRACT

The invention relates to a process for manufacturing unsaturated polyester resins with suppressed volatilization of monomer, useful in the manufacture of laminates, moulding compounds, varnish coatings and castings. It is known a process for manufacturing unsaturated polyester resins by dissolving unsaturated polyesters in monomers with the addition of paraffin, waxes, ceresin wax, emulsifiers forming emulsions of the "water-in-oil" or "oil-in-water" type. These additives suppress the volatilization of monomers, but they exhibit a limited solubility in the resin and a majority of them separate on the surface during curing of the polyester resin and, thus, reduce the adhesion capacity of the subsequent layers of resin or laminates to the previously cured substrate.

It has been found that unsaturated polyester resins with suppressed volatilization of monomer can be prepared by dissolving the unsaturated polyester in the monomer and by introducing 0.005–5.0 parts by weight of compounds of a general formula [RCOOCH$_2$CH(OH)CH$_2$O]$_n$A per 100 parts by weight of polyester resin. These compounds are soluble in polyester resins, do not cause any turbidity of the cured resin and do not form any separating layer between the subsequently applied layers of a cast coating of glass reinforced polyester laminate.

2 Claims, 5 Drawing Figures

FORMULA 1

FORMULA 2

FORMULA 3

FORMULA 4

FORMULA 5

PROCESS FOR MANUFACTURING UNSATURATED POLYESTER RESINS WITH REDUCED VOLATILIZATION OF MONOMER

This application is a continuation of application Ser. No. 155,010, filed May 30, 1980, abandoned.

FIELD OF THE INVENTION

The invention relates to manufacturing of unsaturated polyester resins with reduced volatilization of the monomer, which are useful for manufacturing of laminates, moulding compounds, varnish coatings and castings.

BACKGROUND OF THE INVENTION

The known process for manufacturing of unsaturated polyester resins consists in dissolution of an unsaturated polyester in a monomer, with an optional addition of inhibitors, fillers and polymerization initiators. Monomers used for polyester resins, however, volatile and are partly evaporate during processing of the resin, before it is completely cured, especially if the resin is used in a form of a very thin varnish coating or of a thin laminate with a large surface.

Various additives of the type of paraffin, wax, ceresine and emulsifying agents (yielding emulsions of the type "water in oil" or "oil in water") are added to reduce the volatilization of the monomer. For instance, according to British patent specification Nos. 713,332, 744,468 and 774,807 and French patent specification No. 1061133, to polyester resins and varnishes there are added small quantities of paraffins or waxes, which—during curing of the resin—are deposited at its surface, rendering it less accessible for oxygen and simultaneousely diminishing evaporation of the volatile monomers. The additives of this kind form, however, a separating layer, which reduces adhesion of subsequent laminate layers to the substrate layer previously gelled or cured.

In German patent specification No. 2554930 an addition of waxes, derivatives or sorbitol, glycerol, polyoxyethylene, trimethylolpropane, pentaeritritol, butanetriol, pentose, hexose and other polyhydricalcohols (which are generally defined as "water in oil" or "oil in water" emulsifiers and not waxes) is recommended. Solubility of these additives in the resin is however limited and therefore some of them cause opacity of the cured resin.

THE INVENTION

It has been found unexpectedly that unsaturated polyester resins having suppressed volatilization of monomer can be obtained by dissolving the unsaturated polyester in the monomer and by addition to 100 parts (by weight) of the resin of 0.005–5 pbw, separately or in a form of a mixture, of compounds of general formula $[RCOOCH_2CH(OH)CH_2O]_nA$, where R is alkyl, alkenyl, alkadienyl, hydroxyalkyl or hydroxyalkenyl groups containing 12 to 22 carbon atoms, preferably of linear structure and A is phenyl, phenyl substituted at the 2- or 4-position with one or two —$CH_3$ groups or —Cl atoms or A—C/=O/ group, where n is 1, p-phenylene or m-phenylene group or

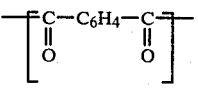

group, a group of formula 1 in the Figs. or a group of formula 2 in the Figs., in which m is 0 to 4 and n is 2, or a group of formula 3 in the Figs., in which X is hydrogen or —$C(CH_3)_3$ and k is 0 to 6 and n is 2 to 8, respectively.

The other type of monomer volatilization suppressing additives recommended are compounds of the same formulae and the same R, with A being linear or branched alkyl, alkenyl or alkylcarbonyl containing 2–9 carbon atoms, with n=1, or linear or branched alkylene or alkenylene containing 2–8 carbon atoms or a group of general formula —OC—$(CH_2)_p$—CO— with p=2–8, or a group of general formula —$A_1[OCH_2CH(CH_2Cl)—]_r$ or $A_1[—O—CH_2CH(OH)—CH_2—OA_1—]_r$, where $A_1$ is linear or branched alkylene group with 2–6 carbon atoms or a group of formula —$A_2OA_2$— or —$A_2$—$OA_2OA_2$, where $A_2$ is linear or branched alkylene group containing 2–4 carbon atoms, esp. —$CH_2CH_2$— or —$CH_2$—$CH(CH_3)$—, and r is zero to three and n=2.

Compounds of the general formula $RCOOCH_2CH(OH)CH_2O_nA$, used in the method according to the invention, are preferably synthetized by heating of epoxy compounds with monocarboxylic acids. Basic compounds, preferably tertiary amines, can be used as catalysts for this reaction.

Initial epoxy compounds used are of the formula 4 in the Figs. where A and n are as above defined, for example phenylglycidyl ether, epoxy resins based on bisphenol A with average molecular weight of 400 or 1000, diglydidyl hexahydrophthalate or epoxynovolak resins, allylglycidyl ether, aliphatic epoxy resins with average molecular weight of 300–600, diglycidyl sebacate or resins based on epichlorohydrin oligomers.

As initial monocarboxylic acids are used acids of formula RCOOH, where R has the formerly defined meaning, for example, stearic, palmitic, behenic, linoleic, linolenic, ricinoleic or "ricinolinoleic" acid.

The compounds according to the invention are soluble in the polyester resin, do not make it opaque after curing and form no separating layer between separately manufactured layers of casting coating or laminate. The polyester resins containing them display very good adhesion to subsequent layers of a casting or coating, or else—in case of polyester-glass laminate—to an initially gelled or cured layer.

The unsaturated polyester resins according to the invention contain polymerisable monomers and generally known oligoacrylates or oligomethacrylates or maleic or fumaric polyesters, optionally modified in a known way with phthalic, tetrachlorophthalic, tetrabromophthalic, isophthalic, terephthalic, adipic or sebacic acid or with diene adducts of maleic anhydride with butadiene, hexadiene, anthracene, β-naphthol, terpenes, cyclopentadiene, hexachlorocyclopentadiene, rosin acids or with other known acids and anhydrides.

The known maleic or fumaric polyesters contain the following glycols: ethylene, diethylene, polyoxyethylene, 1,2-propylene, dipropylene, polyoxypropylene, 1,3-butylene, 1,3-hexylene, neopentyl, propoxylated and ethoxylated bisphenol A, 1,2-cyclohexanodiol with an optional addition of mono- and polyhydric alcohols, as for instance glycerol, trimethylolpropane, hexanetriol and so on.

The acrylic or methacrylic oligoesters are compounds of formula 5 in the Figs., where R is hydrogen or a methyl group and m is zero to 4, or other products of addition of acrylic or methacrylic acids to epoxy resins. Polymerisable monomers are preferably styrene, methyl methacrylate, vinyl acetate and acrylic oligoesters separately or in a form of a mixture.

To stabilize solutions of oligoesters or polyesters in polymerizable monomers it is known to use picric acid or other compounds.

As fillers for polyester resins are used glass fiber, chalk, kaolin, quartz powder, asbestos, silica, magnesium oxide and other known fillers. Polyester resins are cured at ambient temperature or at increased temperature using radical initiators such as benzoyl peroxide, methyl ethyl ketone and cyclohexanone peroxides, cumyl hydroperoxide, chlorobenzoyl peroxide, dicumyl peroxide, optionally in the presence of amine or cobalt accelerators, or else they are cured with uv or visible irradiation, using corresponding sensitizers, or with high-energy irradiation.

The compounds according to the invention are added to the known polyester resins either after synthesis is completed, during dissolution of the oligoester or polyester in a monomer or prior to processing of the resin, during mixing of the resin with fillers and initiators.

The compounds according to the invention added after synthesis is completed do not affect the stability of the resin, are completely dissolved yielding homogeneous solutions and do not precipitate during storage. The compounds according to the invention added prior to storage or just prior to processing do not alter markedly either the technological properties such as gel time and viscosity or the mechanical and physical properties of the cured resin and of the laminate, as compared to the resin containing no additives of this type.

If to the polyester resin containing paraffin there is added a compound according to the invention, an increase in interlaminar adhesion of separately manufactured layers of casting, coating or laminate and between fiber and the resin is achieved.

In the appended examples all parts indicated are parts by weight.

EXAMPLE I

An amount of 1 part of one of the compounds listed in Table 1 was admixed to 100 parts of a propylene maleate-phthalate polyester resin containing 38% styrene. After thorough mixing 50 g of the composition was poured into a shallow glass dish having a surface of 95 cm$^2$ and placed in a space in which constant stream of air of 0.4 m/sec and constant temperature of 22±1° C. were maintained. Loss of styrene from the composition was determined after 1 hr under this conditions (Table 1).

EXAMPLE II

An amount of 0.02 part of the compound listed in Table 1 and 0,02 part of paraffin were admixed to 100 parts of propylene maleate polyester resin containing 38% styrene. Volatilization of styrene from the resulting composition was determined in the same way as in Example I (Table 1).

EXAMPLE III

An amount of 0.01 part of the compound listed in Table 1 was admixed to 100 parts of unsaturated polyester resin containing 23% styrene and 15% methyl methacrylate. Volatilization of monomers from the resulting composition was determined in the same way as in Example I.

EXAMPLE IV

An amount of 0.05 part of the compound listed in Table 1 was admixed to 100 parts of unsaturated polyester resin containing 38% styrene. Loss of styrene from the resulting composition was determined in the same way as in Example 1.

EXAMPLE V

To 100 parts of solution containing 60% of compound of formula 5, where X is methyl and m=1 and 40% of styrene, there was added 0.1 part of the compound listed in Table 1. Volatilization of styrene from the composition was determined in the same way as in Example I and the result is given in Table 1.

For of comparing results, data for the same resin containing no volatilization suppressing additive are given (Table 1).

EXAMPLE VI

To 100 parts of propylene maleate-phthalate polyester resin containing 38% styrene there was admixed 1 part of one of the compounds listed in Table 2. The thoroughly mixed composition and fiber glass fabric EM-1003 with basic weight of 600 g/m$^2$ were used for manufacturing of polyester-glass laminate in such a way that after lamination and curing of one layer of fabric, the subsequent laminate layer was layed up after 24 hrs. As the curing system for the laminate, there were used 4% benzoyl peroxide (50% paste in dibutyl phthalate) and 0.2% N,N-dimethylaniline (10% solution in styrene). The gel time was about 30 minutes. Interlaminar adhesion of the laminate was investigated using samples of 10×50 mm by impact with a weight of 1 kg falling of the height of 25 cm upon a sample fixed in a vertical position in such a way that a portion of the sample of the length of 40 mm was placed above the fastening jaws. The surface area of delamination of the laminate was determined in mm$^2$. Experiments were carried out also with other additives listed in Table 2.

EXAMPLE VII 1000 g of composition consisting of polyester resin and of the compound having general formula [RCOOCH$_2$CH(OH)CH$_2$O]$_n$A, where R=C$_{17}$H$_{33}$, n=2 and A is defined by formula 2, in which m=0, according to Example I, was mixed with 800 g chalk, 10 g dicumyl peroxide and 700 g glass fiber of 12 mm length. After thorough mixing, the moulding compound was moulded in moulds at 150° C. under pressure of 10 MPa, at time 50 sec per 1 mm of the thickness of the mould. Tensile strength of the moulding obtained from this moulding compound was 50 MPa and its flexural strength—110 MPa.

EXAMPLE VIII

An amount of 1 part of one of the compounds listed in Table 3 was added to 100 parts of unsaturated polyester resin obtained of 2,2-bis-[4-(hydroxypropoxy)-phenyl]propane, maleic anhydride and 1,2-polyoxypropylenediol and containing 50% of styrene. After thorough mixing 50 g of the composition was poured into a shallow glass dish having a surface area of 95 cm$^3$ and placed in a space, where constant air stream of 0.4 m/sec and constant temperature of 22±1° C. were maintained. Loss of styrene was determined after 1 hr of testing (Table 3).

EXAMPLE IX

To 100 parts of unsaturated polyester resin obtained from the diene adduct of maleic anhydride with β-naphthol and containing 50% styrene there was added 0.5 part of one of the compounds listed in Table 3. The resulting composition was poured into a shallow glass dish having surface area of 95 cm$^2$. Loss of styrene was determined after 1 hr under conditions described in Example VIII.

EXAMPLE X

To 100 parts of unsaturated propylene maleate-phthalate polyester resin containing 23% styrene and 15% methyl methacrylate there was added 1 part of one of the compounds listed in Table 3. Loss of monomers determined in the same way as in Example VIII is quoted in Table 3.

EXAMPLE XI

To 100 parts of propylene maleate-phthalate polyester resin containing 38% styrene there was added 1 part of the compound listed in Table 4. The thoroughly mixed composition and fiber glass fabric EM-1003 of basic weight of 600 g/m$^2$ were used for manufacturing of the polyester-glass laminate in such a way that layers of the fabric were laminated up to the thickness of 6 mm and cured, and after 24 hrs subsequent layers of laminate were layed up to total thickness of 12 mm. A system consisting of 2% of methylethyl ketone peroxide and 0.3% of cobalt naphthenate containing 1% cobalt was used for curing the laminate Gel time was about 30 min. Interlaminar adhesion of the laminate was investigated by dynamic method according to ISO/R 179-1961 using samples of 120×15×12 mm and applying spacing of the support of 70 mm and Charpy impact testing machine produced by Schopper Company.

Results of qualitative investigations carried out with a number of additives together with the result for a laminate manufactured of the resin with 0.05 part of paraffin are listed in Table 4.

TABLE 1

| | Additives reducing volatilization of monomer | | | | | | |
|---|---|---|---|---|---|---|---|
| | Compounds of the general formula [RCOOCH$_2$CH(OH)CH$_2$O]$_n$A where | | | other | Quantity of the additive | Loss of weight | |
| Example No | R | n | A | additives | phr* | g/hr | g/m$^2$hr |
| I | C$_{17}$H$_{35}$ | 2 | formula 2: m = 0 | — | 1 | 0,51 | 53,6 |
| | C$_{17}$H$_{35}$ | 2 | formula 2: m = 1 | — | 1 | 0,39 | 41,0 |
| | C$_{17}$H$_{35}$ | 2 | formula 2: m = 2 | — | 1 | 1,05 | 110,5 |
| II | C$_{15}$H$_{31}$ | 2 | formula 1 | paraffine | 0.02 + 0.02 | 0.85 | 89.4 |
| III | C$_{17}$H$_{35}$ | 5 | formula 3: k = 3 x = H | — | 0.01 | 1.20 | 126.3 |
| IV | C$_{17}$H$_{35}$ | 1 | —C$_6$H$_5$ | — | 0.05 | 1.70 | 178.9 |
| V | C$_{17}$H$_{35}$ | 2 | formula 2: m = 1 | — | 0.1 | 1.05 | 110.5 |
| — | — | — | — | — | — | 1.90 | 200.0 | phr = per hundred parts of resin.

TABLE 2

| | Additives reducing volatilization of monomer | | | | | |
|---|---|---|---|---|---|---|
| | Compound of the general formula [RCOOCH$_2$CH(OH)CH$_2$O]$_n$A where | | | other | Quantity of the additive | Surface of delamination of the laminate |
| Example No | R | n | A | additives | phr | mm$^2$ |
| VIa | C$_{17}$H$_{35}$ | 2 | formula 2: m = 1 | — | 1 | 220 |
| b | C$_{17}$H$_{35}$ | 2 | formula 2: m = 0 | — | 1 | 157 |
| c | C$_{17}$H$_{35}$ | 1 | —C$_6$H$_5$ | — | 1 | 127 |
| d | C$_{17}$H$_{35}$ | 2 | formula 2: m = 2 | — | 1 | 177 |
| e | C$_{17}$H$_{35}$ | 2 | formula 2: m = 2 | paraffine | 1 + 0.05 | 297 |
| f | C$_{17}$H$_{35}$ | 1 | —C$_6$H$_5$ | paraffine | 1 + 0.05 | 178 |
| g | — | — | — | paraffine | 0.05 | 442 |
| h | — | — | — | — | — | 173 |

TABLE 3

| Example No | Additives reducing volatilization of monomer Compounds of the general formula [RCOOCH$_2$CH(OH)CH$_2$O]$_n$A where | | | Quantity of the additive phr | Loss of weight g/h |
|---|---|---|---|---|---|
| | R | n | A | | |
| VIII | C$_{17}$H$_{35}$ | 1 | n-C$_4$H$_9$ | 1 | 0.95 |
| | C$_{17}$H$_{35}$ | 1 | CH$_2$=CH—CH$_2$ | 1 | 1.10 |
| | C$_{17}$H$_{35}$ | 1 | C$_7$H$_{15}$CO | 1 | 0.90 |
| | C$_{15}$H$_{31}$ | 2 | —(CH$_2$)$_4$— | 1 | 0.51 |
| | C$_{17}$H$_{35}$ | 2 | —CH$_2$—CH=CH—CH$_2$— | 1 | 1.05 |
| | C$_{17}$H$_{35}$ | 2 | —CH$_2$—CH$_2$—O—CH$_2$—CH$_2$— | 1 | 1.24 |
| | — | — | — | — | 1.67 |
| IX | C$_{15}$H$_{31}$ | 2 | CH$_2$CH$_2$—[OCH$_2$CH(OH)CH$_2$OCH$_2$CH$_2$]$_2$ | 0.5 | 0.60 |
| | C$_{17}$H$_{35}$ | 2 | —CH$_2$CH$_2$—O—CH$_2$CH$_2$— | 0.5 | 0.75 |
| | C$_{17}$H$_{35}$ | 2 | —(CH$_2$)$_4$— | 0.5 | 0.64 |
| | C$_{15}$H$_{31}$ | 2 | —OC—(CH$_2$)$_6$—CO— | 0.5 | 0.50 |
| | — | — | — | — | 1.49 |
| X | C$_{17}$H$_{35}$ | 2 | —CH$_2$CH$_2$—OCH$_2$CH(OH)CH$_2$O—CH$_2$CH$_2$— | 1 | 0.43 |
| | C$_{17}$H$_{35}$ | 2 | —(CH$_2$)$_4$— | 1 | 0.35 |
| | C$_{17}$H$_{35}$ | 1 | C$_7$H$_{15}$—CO— | 1 | 0.90 |
| | C$_{17}$H$_{35}$ | 1 | C$_4$H$_9$ | 1 | 0.85 |
| | — | — | — | — | 1.45 |

TABLE 4

| Example No | Additives reducing volatilization of monomer Compounds according to the invention where | | | Other additives | Quantity of the additive phr | Results of dynamic investigations |
|---|---|---|---|---|---|---|
| | R | n | A | | | |
| XI | C$_{17}$H$_{35}$ | 2 | —CH$_2$CH$_2$—O—CH$_2$CH$_2$— | — | 1 | No delamination at separating boundary of the laminate |
| XI | C$_{15}$H$_{31}$ | 2 | —(CH$_2$)$_4$ | — | 1 | No delamination at separating boundary of the laminate |
| | — | | | paraffin | 0.05 | Delamination at separating boundary of the laminate |

We claim:

1. A method for the manufacture of unsaturated polyester resins exhibiting reduced volatilization of its monomer, which comprises the steps of disolving in 100 parts of the unsaturated styrene-containing polyester resin mix and its precursors, from 0.005 to 5 parts of a monomer volatilization suppressing additive according to the formula:

(R—COOCH$_2$—CH(OH)—CH$_2$O)$_2$A where R is selected from the group consisting of alkyl, alkenyl, alkadienyl, hydroxyalkyl and hydroxyalkenyl of 12 to 22 carbon atoms and A has the formula:

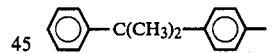

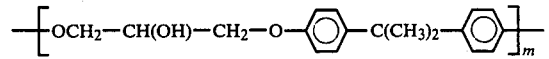

where m is 0 to 4.

2. The method according to claim 1 wherein said unsaturated polyester resin is the propylene maleate-phthalate polyester resin containing styrene.

* * * * *